United States Patent

[11] 3,616,385

| [72] | Inventors | Richard K. Kloss<br>Forest Park;<br>Gene W. Claybaugh, Green Township, Hamilton County; David D. Whyte, Wyoming, all of Ohio |
|---|---|---|
| [21] | Appl. No. | 844,113 |
| [22] | Filed | July 23, 1969 |
| [45] | Patented | Oct. 26, 1971 |
| [73] | Assignee | The Procter & Gamble Company<br>Cincinnati, Ohio |

[54] CHLORINE- AND CHLORIDE-FREE HYPROCHLOROUS ACID BY ELECTRODIALYSIS
10 Claims, 1 Drawing Fig.

[52] U.S. Cl. .................................................. 204/180 P,
204/128, 204/130
[51] Int. Cl. ..................................................... B01d 13/02
[50] Field of Search .......................................... 204/180 P,
151, 128, 129, 130

[56] References Cited
UNITED STATES PATENTS

| 2,829,095 | 4/1958 | Oda et al. ...................... | 204/98 |
| 2,860,095 | 11/1958 | Katz et al. ...................... | 204/180 P |
| 3,129,152 | 4/1964 | Teske et al. ...................... | 204/128 |
| 3,272,737 | 9/1966 | Hansen et al. .................. | 210/22 |
| 3,318,788 | 5/1967 | Mintz ............................. | 204/130 |

Primary Examiner—John H. Mack
Assistant Examiner—A. C. Prescott
Attorney—Robert B. Aylor ABSTRACT: An essentially chlorine- and chloride-free aqueous solution of hypochlorous acid is prepared from chlorine water by an electrodialysis process which employs ion-selective, semipermeable membranes; a chlorine water pH of from about 2.75 to about 7.5 is preferred to achieve maximum efficiency of the process.

SCHEMATIC TOP VIEW OF AN ELECTRODIALYSIS UNIT

LEGEND:
T —Terminal cells aqueous electrolytic solution influent
TE—Terminal cells aqueous electrolytic solution effluent
C —Concentrating cells aqueous electrolytic solution influent
CE—Concentrating cells aqueous electrolytic solution effluent
W —Chlorine-Water
H —Hypochlorous acid solution

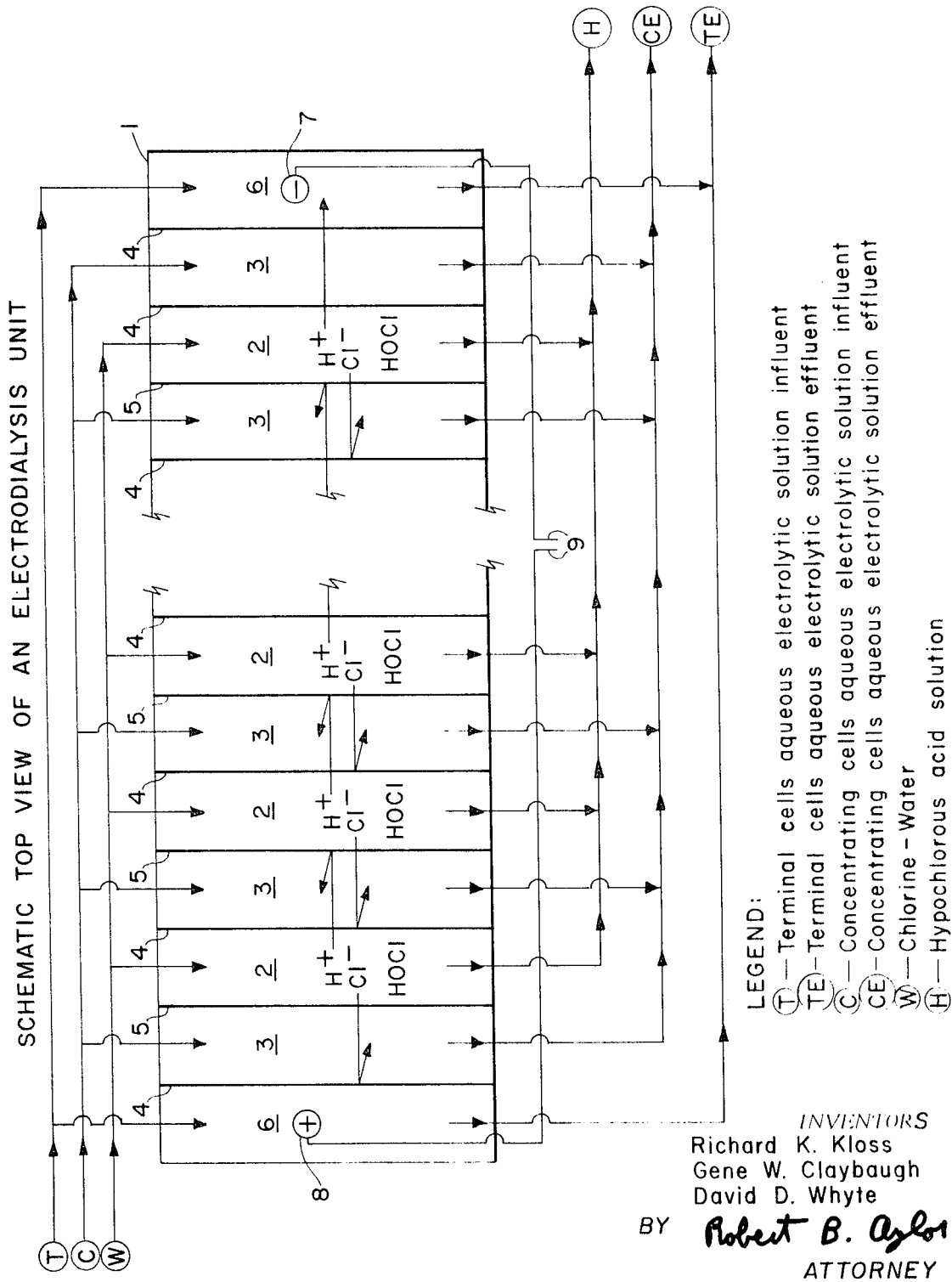

CHLORINE- AND CHLORIDE-FREE HYPOCHLOROUS ACID BY ELECTRODIALYSIS

CROSS-REFERENCE TO RELATED APPLICATIONS

A process for preparing chlorohydrins in high yields by reacting a long-chain olefin with an aqueous solution of hypochlorous acid under certain reaction conditions is disclosed in a copending application by Richard K. Kloss, Gene W. Claybaugh, and David D. Whyte, entitled "Preparation of Chlorohydrins Starting With Hypochlorous Acid and Long-Chain Olefins," Ser. No. 823,476, filed May 9, 1969. The use of chlorine- and chloride-free hypochlorous acid aqueous solution is especially preferred in the process disclosed in said application in order to substantially minimize the formation of dichloroalkanes, a reaction byproduct.

BACKGROUND OF THE INVENTION

Hypochlorous acid is a compound widely used in the formulation and/or preparation of many commercial products. It is generally prepared by bubbling molecular chlorine gas through water to form 'chlorine-water,' which comprises, as reaction products, hypochlorous acid (HOCl), hydrochloric acid (HCl), chlorine hydrate ($Cl_2 \cdot 8H_2O$), and free molecular chlorine ($Cl_2$) dispersed in the water, in accordance with the equilibrium reactions:

(1) $Cl_2 + H_2O \rightleftharpoons HOCl + HCl$ 
(2) $Cl_2 + H_2O \rightleftharpoons Cl_2 \cdot 8H_2O \downarrow$ 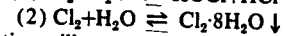

The above reactions illustrate that the initial reaction of molecular chlorine gas and water results in the formation of hydrochloric and hypochlorous acids and that, after the water-solubility limits of hypochlorous and hydrochloric acids and of molecular chlorine gas are reached, the additional molecular chlorine gas reacts with water to form insoluble chlorine hydrate.

When hypochlorous acid (in chlorine water) is used, e.g., in formulating or preparing bleaches, the bleaches are subject to instability during shelf life due to the presence of free chloride anions (from dissociated hydrochloric acid) in the solution.

Additionally, when hypochlorous acid (in chlorine water) is reacted with long-chain olefins (i.e., olefins having from 8 to about 30 carbon atoms) to prepare chlorohydrins, which are extremely versatile building blocks for many organic compounds, the reaction is particularly subject to the formation of dichloroalkanes, undesirable byproducts which, in their formation, decrease the yield of the desired chlorohydrin reaction product. In reaction with long-chain olefins, dichloralkanes form in accordance with the unbalanced reaction:

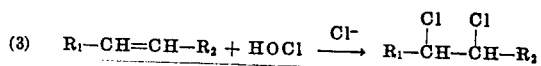

(3) $R_1-CH=CH-R_2 + HOCl \xrightarrow{Cl^-} R_1-\underset{\underset{Cl}{|}}{C}H-\underset{\underset{Cl}{|}}{C}H-R_2$ wherein $R_1$ is an alkyl, $R_2$ is hydrogen or an alkyl, and the sum of the number of carbon atoms of $R_1$ or $R_1$ and $R_2$, where $R_2$ is an alkyl, ranges from 6 to about 28; $Cl^1$ is derived from dissociated hydrochloric acid contained in the chlorine water.

The prior art has recognized the utility of essentially chlorine- and chloride-free hypochlorous acid in such formulations and processes. Accordingly, methods of removing the molecular chlorine and chloride anions from chlorine water have been suggested and include the use of a silver or mercuric compound to form an insoluble chloride salt which precipitates out of the chlorine water, or the vacuum distillation of chlorine water. However, the prior art has failed to recognize that an electrodialytic process can be employed to remove the free molecular chlorine and chloride anions contained in the chlorine water to achieve an aqueous solution of hypochlorous acid which is essentially chlorine- and chloride-free.

Therefore, it is an object of this invention to provide an electrodialytic process for the preparation of an essentially chlorine- and chloride-free aqueous solution of hypochlorous acid.

BRIEF SUMMARY OF THE INVENTION

These and other objects are achieved by the invention herein which comprises a process of removing free molecular chlorine and free chloride anions from chlorine water, preferably having a pH of from about 2.75 to about 7.5, by electrodialysis, whereby an aqueous solution of essentially chlorine- and chloride-free hypochlorous acid is obtained.

When, in reaction (1) above, molecular chlorine gas is bubbled through water, the reaction produces chlorine water which is an aqueous solution that comprises hypochlorous acid in an undissociated state, hydrochloric acid which immediately upon formation ionizes to hydrogen cations ($H^+$) and chloride anions ($Cl^1$), a small amount of free molecular chlorine gas dispersed in the water, and a small amount of chlorine hydrate ($Cl_2 \cdot 8H_2O$) which is a water-insoluble solid that precipitates out of the solution. The pH of chlorine water prepared in this manner is acidic (about 1.5) due to the dissociation of hydrochloric acid.

According to the invention herein, a process is provided for removing free molecular chlorine and free chloride anions from chlorine water by electrodialysis, whereby an aqueous solution of essentially chlorine- and chloride-free hypochlorous acid is obtained. The term "electrodialysis," as used herein, means the application of electrical energy to an electrodialysis unit to effect the migration of chloride anions out of one aqueous solution (the chlorine-water) and into another aqueous solution through an ion-selective, semipermeable membrane.

A suitable electrodialysis unit employed herein comprises a container, made of a suitable insulating material (e.g., glass or molded plastic), divided into two cells: a diluting cell (which contains chlorine water) positioned adjacent to a concentrating cell (which contains an aqueous electrolytic solution) and separated from the concentrating cell by a cationic ion-selective, semipermeable membrane, both cells additionally containing an electrode, with the anode being disposed in the concentrating cell and the cathode being disposed in the diluting cell. A source of electrical energy is connected to the two electrodes.

Briefly, electrodialysis employs electrical energy which is applied to electrodes, an anode and a cathode, contained within the electrodialysis unit (also referred to herein as "unit" for brevity). The electrical energy creates an electrical current across the unit; this current is in the form of negatively charged chloride anions and positively charged hydrogen cations moving toward the anode and cathode, respectively. The chloride anions pass from the diluting cell, through the cationic membrane, and into the concentrating cell. In this manner, the free chloride anions are removed from the chlorine water.

Additionally, when chlorine water is electrodialyzed (i.e., subjected to electrodialysis), the free molecular chlorine gas in the chlorine water is removed. Since much of the free molecular chlorine gas present in chlorine water is believed to be formed by the equilibrium of reactions (1) and (2) above, the removal of chloride anions by electrodialysis drives reaction (1) toward the formation of hydrochloric acid and additional hypochlorous acid and away from the formation of molecular chlorine. As the hydrochloric acid forms, it dissociates and is removed by continuing electrodialysis. Further, as reaction (1) is driven to the right and depletes the molecular chlorine gas dispersed in the water, additional molecular chlorine is formed by reaction (2) above being driven to the left; i.e., toward the formation of additional molecular chlorine which is then used in the formation of additional hydrochloric and hypochlorous acids. In this manner, about 98 percent of the free chloride anions and free molecular chlorine are removed from the chlorine water to achieve an essentially chloride- and chlorine-free aqueous solution of hypochlorous acid which can then be collected or recovered from the electrodialysis unit by any convenient manner.

REFERENCE TO THE DRAWING

The FIGURE is a top schematic view of a preferred electrodialysis unit employed herein.

DETAILED DESCRIPTION OF THE INVENTION

The invention herein provides a process for removing free chloride anions and free molecular chlorine from chlorine water.

In a preferred embodiment of the process herein, both chloride anions and hydrogen cations are removed from the chlorine water by an electrodialysis process which comprises the steps of:

A. passing a feed stream of chlorine water through the diluting cells of an electrodialysis unit while simultaneously passing a feed stream of an aqueous electrolytic solution through the concentrating cells of said unit, said unit comprising a plurality of diluting cells which alternate in sequence with and are situated between adjacent concentrating cells, said unit additionally comprising a plurality of anionic and cationic ion-selective, semipermeable membranes which alternate in sequence, each membrane dividing and being shared by adjacent cells, said unit further comprising an anode and a cathode, which are in the terminal cells of said unit, said anode and cathode being connected to a source of direct current; said cationic membrane forming the side of said diluting cell nearer the anode and the side of said concentrating cell nearer the cathode, and said anionic membrane forming the side of said diluting diluting cell nearer the cathode and the side of said concentrating cell nearer the anode;

B. passing a direct current of from about 0.001 to about 0.200 amperes per square centimeter of said membranes across said diluting and concentrating cells and across said anionic and cationic membranes and between said anode and cathode; and, C. recovering the essentially chlorine- and chloride-free aqueous solution of hypochlorous acid from the diluting cells.

THE ELECTRODIALYSIS UNIT

The process herein employs an electrodialysis unit, which basically comprises a container, made of a suitable insulating material (e.g., glass or molded plastic), divided into concentrating, diluting, and terminal cells or compartments by ion-selective, semipermeable membranes. The term "diluting X cell," as used herein, means the compartment into which a stream of chlorine water is fed and in which the chloride anions in the chlorine water are diluted or removed to provide an essentially chloride- and chlorine-free effluent aqueous solution of hypochlorous acid. The term "concentrating cell" herein means the compartment into which a stream of an aqueous electrolytic solution is fed and into which the chloride anions concentrate or migrate. The term "terminal cells," as used herein, means the two end cells of the electrodialysis unit in which are disposed the electrodes, a cathode being in one terminal cell and an anode being in the other, and into which a stream of an aqueous electrolytic solution is fed.

The ion-selective, semipermeable membranes employed herein are termed "anionic membranes" and "cationic membranes." The anionic and cationic membranes are semipermeable in that they permit the passage-through of dissociated ions but essentially prevent the passage-through of undissociated hypochlorous acid. The anionic membrane is ion-selective in that it is permeable to cations but not to anions; the cationic membrane is ion-selective in that it is permeable to anions and not to cations.

In a preferred practice of this invention, the electrodialysis unit comprises a container divided into a plurality (e.g., from about 10 to about 100 or more) of linearly arranged diluting and concentrating cells which alternate in sequence such that each diluting cell is positioned adjacent, to and between two concentrating cells; i.e., a concentrating cell followed by a diluting cell, in turn, followed by concentrating cell, in turn followed by a diluting cell, etc., with one more concentrating cell than diluting cells.

Adjacent concentrating and diluting cells are separated by anionic and cationic membranes which alternate in sequence, such that an anionic membrane is followed by a cationic membrane, in turn, followed by an anionic membrane, etc. Thus, each diluting cell has as two opposing sides both an anionic and a cationic membrane. Preferably, the anionic and cationic membranes are equal in area and are parallel to one another.

The anionic and cationic membranes must be properly located with respect to the anode and cathode contained in the terminal cells. The sides of each diluting cell which are nearest to the anode are formed by cationic membranes; the sides of each diluting cell which are nearest to the cathode are formed by anionic membranes. In this manner, chloride anions in the chlorine water are allowed, in their migration toward the positively charged anode, to pass through the cationic membrane of the diluting cell and into an adjacent concentrating cell; hydrogen cations are allowed, in their migration toward the negatively charged cathode, to pass through the anionic membrane and into an adjacent concentrating cell.

In similar fashion, the sides of each concentrating cell which are nearest to the anode are formed by anionic membranes; the sides of each concentrating cell which are nearest to the cathode are formed by cationic membranes. In this manner, the hydrogen cations and the chloride anions are prevented from further migrating into adjacent diluting cells.

The two end cells of the linearly arranged unit are terminal cells and contain electrodes, an anode being contained in one terminal cell and a cathode being contained in the other. The terminal cells are each adjacent to only one other cell of the unit and, therefore, comprise only one anionic or cationic membrane which separates the terminal cells from their adjacent cells; the end wall of the terminal cells (i.e., the wall opposite the anionic or cationic membrane) is formed by the container of the unit.

The electrodes, to which an electrical energy source (i.e., a direct current source) is attached, can be made of any suitable, electrically conductive material, e.g., nickel, platinum, carbon, steel, or the like. The electrodes can be of any physical form, e.g., they can be rods or poles disposed in the terminal cells or they can be plates which form or comprise the end wall of the container and of the terminal cells.

The two end concentrating cells can serve as terminal cells in that they can have only one cationic or anionic membrane, can be adjacent to diluting cells, and can contain the hydrogen and chloride ions which migrate out of the adjacent diluting cells.

Preferably, however, the terminal cell containing the anode is adjacent to a concentrating cell and separated therefrom by an anionic membrane. In this manner, the anode is not exposed to the oxidative effects of the chloride anions as they migrate out of the diluting cells toward the anode.

Most preferably, both terminal cells are adjacent to concentrating cells and separated therefrom by anionic membranes. By this method, an aqueous electrolytic feed stream which does not contain chloride anions or molecular chlorine can be utilized in the terminal cells without contaminating the preferred hydrochloric acid feed stream utilized in the concentrating cells, as discussed hereinafter.

The anionic and cationic membranes employed herein are known in the art. Generally, the anionic and cationic membranes comprise flat sheets of inorganic or organic materials which have extreme water-insolubility. Preferably the anionic and cationic membranes are prepared from synthetic organic resinous, polymeric materials, (e.g., polystyrene polymers) to which are bonded ionic groups. Any strong or weak base (e.g., tertiary amines or quaternary ammonium compounds) can be chemically bonded to the organic material to form cationic membranes; any strong or weak acid (e.g., aryl sulfonates) can be chemically bonded to the organic resinous material to form anionic membranes.

Generally, the anionic and cationic membranes herein are "backed" or reinforced with an imbedded screen or mat of, for example, fiberglass or dynel, to provide them with a substantially rigid structure. Other 'backings' can be used, provided the anionic and cationic membranes remain essentially impervious to mass flow but porous enough to permit ion migration or transfer.

Specific examples of organic cationic and anionic membranes suitable for use herein include, among others: AMF–60,100, and –300 (American Machine & Foundry Co.); CMG–10, –20, AMT–10, –20, and GMT–1 (Asaki Glass Co.); any "Nepton" ion transfer membrane and "Ionac" MC–3142, –3235, –3470XL, MA–3148, –3236, and –3475XL (Ionics, Inc.)

Preferably, the membranes used herein are essentially stable in chlorine water and not chemically degraded by the free molecular chlorine and chloride anions therein. Inorganic ion exchange membranes recently developed by McDowell Douglass Corp., Astro-Power Lab, and the Research Institute of the Illinois Institute of Technology are reportedly suitable membranes in this respect.

Many other membranes, suitable for use herein, are known in the art; examples of such membranes include those disclosed in U.S. Pat. Nos. 2,762,272; 2,730,768; and 2,860,097.

One embodiment of an electrodialysis unit (top view) preferred herein is shown schematically in the FIGURE, wherein:

The electrodialysis unit comprises a container 1 which is made of molded plastic and divided into a plurality of linearly arranged diluting cells 2 and concentrating cells 3; the diluting and concentrating cells alternate in sequence such that each diluting cell is positioned between and adjacent to two concentrating cells; the diluting and concentrating cells are formed by the container and by a plurality of anionic 4 and cationic 5 membranes which are equal in area, positioned parallel to one another, and are alternated in sequence such that each diluting cell has as two parallel, opposing sides both a cationic and an anionic membrane; the terminal cells 6, which are formed by the container walls and a single anionic membrane 4, are each adjacent to a concentrating cell and separated therefrom by the anionic membrane; a cathode 7 is disposed in one terminal cell, and an anode 8 is disposed in the other; a source of electrical energy (not shown) is attached by, e.g., wires 9 to the anode and cathode.

While not illustrated or described in detail herein, the electrodialysis units additionally comprise storage tanks (for the feed streams), influent conduits and manifolds, effluent manifolds and conduits, collection reservoirs, pumps, valves, voltmeters, flowrate indicators, and other apparatus and equipment necessary or useful in practicing the process herein. Moreover, the individual cells of the electrodialysis units can vary as to area or size by spacing the anionic and cationic membranes any practical distance apart (e.g., with spacers) and as to shape by using cylindrical or other geometric shapes as desired.

AQUEOUS ELECTROLYTIC SOLUTION

The invention herein additionally comprises a stream of an aqueous electrolytic solution which is fed into the concentrating and terminal cells of the electrodialysis unit.

The aqueous electrolytic solution feed stream can be prepared from any water-soluble, highly conductive or electrolytic compound. Many such compounds are known in the art and include, for example, strong acids and strong bases. Preferred strong acids are the mineral acids, exemplified by hydrochloric acid, sulfuric acid, phosphoric acid, and nitric acid; strong organic acids, such as phenolic acid, can also be used. Preferred strong bases are exemplified by inorganic alkali metal hydroxides, such as sodium, lithium or potassium hydroxide, and by bases such as ammonium hydroxide, as well as hydrocarbyl substituted ammonium hydroxides. A particularly preferred aqueous electrolytic solution, used as a feed stream, essentially consists of a hydrochloric acid in water solution.

The same aqueous electrolytic solution can be fed into both the concentrating cells and the terminal cells. However, it is desirable that the aqueous electrolytic solution employed in the terminal cells should not contain chlorine or chloride anions. Accordingly, sulfuric acid is a particularly preferred compound for use in preparing an aqueous electrolytic solution to be fed into the terminal cells. As mentioned above, the terminal cells are each preferably positioned adjacent to a concentrating cell and separated therefrom by an anionic membrane; by utilizing such a unit, the electrodes in the terminal cells are not subject to chlorine or chloride corrosion, and the aqueous electrolytic solution of hydrochloric acid, preferred as the concentrating cell feed stream, is not contaminated by migrating sulfate or other anions (other than chloride anions) used to prepare the aqueous feed stream fed into the terminal cells.

Although not essential to the invention herein, the electrolytic compound is added to water in an amount to provide, generally, from about a 0.01 N to about a 1.0 N, preferably from about a 0.005 N to about 0.2 N, aqueous solution.

CHLORINE WATER FEED STREAM

The invention herein provides a process for removing free chloride anions and molecular chlorine from chlorine water to obtain an essentially chlorine- and chloride-free aqueous solution of hypochlorous acid.

The chlorine water feed stream employed herein can be prepared by methods known in the art. A generally used method comprises bubbling molecular chlorine gas (a commercially available commodity) through water (0° C.) until the water becomes cloudy; the cloudiness indicates that the level of chlorine gas water-solubility has been exceeded and the formation of chlorine hydrate from excess chlorine gas. Chlorine water, prepared in this manner, comprises, by weight, about 0.1 percent hypochlorous acid and about 0.09 percent hydrochloric acid; the chlorine hydrate precipitates out of the chlorine water, leaving a balance of about 99.8 percent essentially water. This chlorine water, termed herein "unadjusted chlorine water" for comparative purposes hereinafter, generally has a pH of about 1.5 and is prepared from, by weight, about 0.18 percent molecular chlorine gas and about 99.8 percent water.

To obtain maximum efficiency of the process herein, it is preferred that adjusted chlorine water by employed as a feed stream. The term "adjusted chlorine water," as used herein, means chlorine water having a pH within the range of from about 2.75 to about 7.5, particularly from about 3 to about 6, and most particularly, about 5 to 6.

When adjusted chlorine water is employed herein, the efficiency of the process of the invention herein can be significantly increased.

By way of explanation, best processing efficiency is achieved when the operational costs (especially, the cost of necessary electrical energy and of the anionic and cationic membranes) are minimized. Minimization of costs is provided when short processing times can be employed to obtain large quantities of electrodialyzed chlorine water. Short processing times and large amounts of electrodialyzed chlorine water can be obtained when high levels of electrical energy (e.g., above about 0.064 amperes per square centimeter of membrane area) are applied to the unit. However, concentration polarization occurs at high levels of electrical energy.

Concentration polarization occurs when the high level of current per area of anionic or cationic membrane (i.e., "current density") causes the chloride anions (and hydrogen cations) immediately adjacent to the surface or interface of the anionic and cationic membranes of the diluting cells to migrate through the cationic (and anionic) membranes faster than they are replaced by diffusion of chloride anions (and hydrogen cations) in the remaining chlorine water in the diluting cell; as the area immediately adjacent to the surface of the anionic and cationic membranes becomes ion-depleted, a sharp, high rise in the electrical resistance which disrupts the flow of current (i.e., the migration of the electrically charged ions) through the cells is effected.

Concentration polarization decreases processing efficiency. For example, additional electrical energy is needed to overcome the increased resistance of the ion-depleted area adjacent to the membrane surfaces; when this additional electrical energy is applied it can cause the normally undissociated hypochlorous acid molecules to dissociate and pass through the anionic and cationic membranes, and it can cause the membranes to deteriorate rapidly due to the effects of heat and salts precipitating on the membranes.

By utilizing adjusted chlorine water herein, maximum efficiency of the process can be obtained. For example, high current densities can be employed without the occurrence of concentration polarization when adjusted chlorine water is employed herein. Additionally, the capability of utilizing high current densities reduces the cost of the electrical energy and anionic and cationic membrane area required, inasmuch as short processing times can be used to obtain large amounts of electrodialyzed chlorine water. Further, high percentages of molecular chlorine and chloride anion removal can be obtained prior to reduction of diluting cell conductivity.

Adjusted chlorine water can be prepared by bubbling molecular chlorine gas through water to which a strong base has previously been added. Suitable strong bases include, for example, lithium and potassium hydroxide, particularly sodium hydroxide; other bases, e.g., sodium carbonate, can be used, although bases having monovalent ions and small molecules are preferred.

The amount of base added to the water is guided by the desired pH or by the desired concentration of hypochlorous acid; the higher the pH or HOCl concentration desired, the more base should be added. For example, to obtain a pH of 7, a given molar amount of NaOH is added to the water and an equimolar amount of chlorine gas is bubbled through the water. Additionally, adjusted chlorine water can be prepared by bubbling chlorine gas through water until the water turns cloudy, titrating to determine chloride anion molar concentrations, adding an equimolar amount of a strong base, taking a pH reading, bubbling additional chlorine gas through the water until the water turns cloudy, etc., until a desired pH level is obtained.

Accordingly, the chlorine water feed stream employed herein can have a pH within the range of from about 1 to about 7.5 and can be prepared, by weight, from about 0.1 percent to about 15 percent molecular chlorine gas and from about 85 percent to about 99.9 percent water.

The chlorine water is fed into the diluting cells of the electrodialysis unit, and an aqueous electrolytic solution is fed into the concentrating and terminal cells of the unit simultaneously. Any desired flowrate and flow-direction can be employed for the feed streams; preferably, the feed streams flow into their respective cells in the same direction at a flowrate of about 2 liters per minute.

As the feed streams flow into their respective cells, electrical energy is applied to the electrodes of the unit and across the cells and anionic and cationic membranes. The chloride anions in the chlorine water (in the diluting cells) migrate toward the anode, out of the diluting cell, through the cationic membrane, and into an adjacent concentrating cell. Similarly, the hydrogen cations migrate toward the cathode, out of the diluting cell, through the anionic membrane and into an adjacent concentrating cell.

The electrical energy employed herein is derived from a direct current source and is described in terms of amperes per unit of cationic or anionic membrane area (i.e., current density), each of the cationic and anionic membranes being equal in area.

The current densities employed herein range from about 0.001 amperes to about 0.2 amperes per square centimeter of cationic or anionic membrane area. Below about 0.001 amperes per square centimeter, the current density is inadequate to promote the migration of chloride and hydrogen ions out of the diluting cells, resulting in processing inefficiency; current densities above about 0.2 amperes square centimeter can be used, is desired, when adjusted chlorine water feed streams are employed.

The voltage used can be any amount commensurate with providing a current density within the above-described range of from about 0.001 to about 0.2 amperes per square centimeter. Generally, about 4 volts across each diluting cell of the unit is sufficient.

After the chlorine water is electrodialyzed, the process herein then comprises collecting or recovering the resulting aqueous solution of essentially chlorine- and chloride-free hypochlorous acid by any convenient means, e.g., as the hypochlorous acid aqueous solution passes out of the diluting cells, it is led to a storage vat by means of effluent manifolds and conduits.

The amount of free chloride remaining in the recovered aqueous hypochlorous acid solution can be determined by standard titration; M. W. Lister, "The Decomposition of Hypochlorous Acid," Canadian Journal of Chemistry, Vol. 30, (1952), pp. 879 et seq. If desired, the recovered aqueous hypochlorous acid solution can be recycled and again electrodialyzed to obtain greater removal of chloride anions (and chlorine) from the solution.

Similarly, the aqueous electrolytic solution(s) passing out of the concentrating and terminal cells can be recovered or collected by any convenient means and, if desired, recycled for use in further electrodialysis.

It is not desirable to remove 100 percent of the ionized hydrochloric acid ions. As the chloride and hydrogen ions are removed by electrodialysis, the diluting cell approaches a "dead cell" state. That is, as the chloride and hydrogen ions are removed, there remains fewer ions to maintain the current flow; thus, the electrical resistance of the diluting cell increases, requiring a prohibitive increase in the level of voltage and/or current density applied to the unit, which level undesirably results in deterioration of the membranes and in the dissociation and migration of water molecules, as well as hypochlorous acid.

The following examples serve to illustrate the invention herein and do not limit the invention in any way. Further, other embodiments within the scope of the invention herein will be obvious to those skilled in the art.

In the examples, the electrodialysis unit employed therein was substantially as described and shown in the FIGURE, having 10 diluting cells, 11 concentrating cells, and two terminal cells, each terminal cell being adjacent to a concentrating cell. A direct current source was attached to a Hastelloy-C cathode plate and a platinized tantalum anode plate which were disposed in the terminal cells along the end walls of the terminal cells.

The anionic membrane was a medium porosity, fiber glass backed, sulfonated copolymer of polystyrene (Nepton 61–AZG from Ionics, Inc.), and the cationic membrane was a low porosity, fiber glass backed, copolymer of polystyrene to which quaternary ammonium and tertiary amine groups were attached (Nepton 110–DYG from Ionics, Inc.). The membranes each had effective membrane areas of 0.25 square feet or 232 square centimeters and were spaced and held about 0.04 inch from one another by plastic strips or "spacers" about 0.04 inch thick. The spacers covered a portion of the membranes, and this covered portion was, therefore, uninvolved in the transfer of chloride and hydrogen ions. The remaining or uncovered membrane portion constituted the membrane area available for ion transfer and are termed herein "effective membrane areas."

In all examples, unless otherwise noted, the aqueous electrolytic solution feed stream in the concentrating cells was a 0.1 N hydrochloric acid solution, and the aqueous electrolytic solution feed stream in the terminal cells was a 0.1 N sulfuric acid solution.

In all examples, percentages are by weight, unless otherwise noted.

EXAMPLE I

Chlorine water, having a pH of 3.9, was prepared from about 3.57 percent chlorine gas and about 96.43 percent caustic water by, first, bubbling chlorine gas through ordinary water (0° C.) until the water became cloudy, then adding 20.9 grams of sodium hydroxide (per 979.1 grams of chlorine water) and bubbling chlorine gas through the solution until the solution became cloudy. The chlorine water then comprised about 2.7 percent hypochlorous acid and was about 0.55 N in chloride anions (from HCl).

9.9 liters of the chlorine water were used as the chlorine water feed stream, which was continuously recycled through the electrodialysis unit by means of storage vats, pumps, influent and effluent conduits and manifolds; the hydrochloric acid and sulfuric acid aqueous electrolytic solutions were similarly passed through their respective concentrating and terminal cells of the electrodialysis unit and recycled. Flow direction through the unit was the same and flowrate (about 1.9 liters per minute) was substantially the same for each of the three feed streams. Samples of the effluent from the diluting cells were taken every 4 to 6 minutes by means of a tap or valve on the diluting cell effluent conduit, and the current passing across the cells was recorded at the time each sample was taken by means of an ammeter attached to the power source. Voltage across the unit was measured by means of platinum tabs, which were placed into the two concentrating cells adjacent to the two terminal cells and connected to a voltmeter, and similarly recorded.

About 49 volts (about 4 volts across each of the 10 diluting cells) from a direct current source were applied to the electrodes. A sample of the effluent from the diluting cells was taken at about 91.5 minutes; this sample was analyzed and found to contain about 0.054 N free chloride anions, a reduction of 90 percent of the original amount of chloride anions in the chlorine water feed stream. The essentially chlorine- and chloride-free aqueous solution, containing 92 percent of the original amount of hypochlorous acid in the chlorine water feed stream, can then be drawn off through a valve located on the effluent conduit and pumped into a storage vat. For each sample taken, the current recorded was multiplied by the time increment (in minutes) since the last sample; the resulting figures were then added to calculate the amp-minutes used for the 91.5 minutes, 1,129.25 amp-minutes. By dividing the amp-minutes by the time, the average current of 11.8 amperes, was calculated. The average current was divided by the effective membrane area (232 cm.$^2$) to determine the average current density employed: 0.0505 amperes per square centimeter.

To characterize the effect of the pH of the chlorine water feed stream employed in this example, the total specific effective membrane area required to evolve one pound per hour of 90 percent chlorine- and chloride-free hypochlorous acid was calculated and determined as follows:

(1) Weight of HOCl processed $$= \frac{454 \text{ grams/lb.}}{9.9 \text{ liters of chlorine-water} \times 2.7\% \text{ HOCl}}$$

$$= \frac{454 \text{ grams/lb.}}{267.6 \text{ grams HOCl}} = 0.59 \text{ lbs. of HOCl}$$

(2) Effective membrane area used to remove free chloride anions = 0.25 ft.$^2$ per diluting cell × 10 diluting cells = 2.5 ft.$^2$ (3) Processing time = 91.5 minutes or 1.525 hour (4) Processing rate (lbs./hr.) $= \frac{0.59 \text{ lbs.}}{1.525 \text{ hr.}} = 0.387$ lbs./hr.

(5) Specific effective membrane area required $= \frac{2.5 \text{ ft.}^2}{0.387 \text{ lbs./hr.}} = 6.46$ ft.$^2$ per pound of HOCl per hr.

Additionally, the direct current electrical energy requirement to process one pound of hypochlorous acid in this example was calculated and determined as follows:

Direct current electrical energy $= \frac{4 \text{ v. per diluting cell} \times 10 \text{ diluting cells} \times 11.8 \text{ amps.} \times 1.525 \text{ hr.}}{0.387 \text{ lbs. of HOCl} \times 1000}$ $= 2.03$ kilowatt hours per pound of HOCl

EXAMPLE II

Example I was repeated substituting a chloride water feed stream, having a pH of about 1.4, which was prepared from about 0.18 percent chlorine gas bubbled through 99.82 percent ordinary water (0° C.). To remove 90 percent of the chloride anions in the chlorine water, an average current density of 0.0269 amperes per square centimeter was employed; the direct current electrical energy requirement was 0.97 kilowatt hours per pound of HOCl (4 v. per diluting cell), and the specific membrane area requirement was 13.2 square feet per pound of HOCl per hour.

Analysis of the diluting cell effluent aqueous solution determined as essentially chloride- and chlorine-free solution containing 97 percent of the original amount of hypochlorous acid (about 0.1 percent) present in the chlorine water feed stream.

EXAMPLE III

The process of example II was repeated and run for a longer time to achieve 97 percent removal of chloride anions from the chlorine water feed stream. 96 percent of the original amount of hypochlorous acid in the chlorine water was recovered.

The average current density employed was 0.0232 amperes per square centimeter of membrane area. The specific effective membrane area needed to process one pound of HOCl per hour was calculated to be 16.5 square feet; the direct current electrical energy requirement needed to process one pound of HOCl was calculated to be 0.99 kilowatt hours per pound.

EXAMPLE IV

The procedure of example I was repeated, substituting:
1. an electrodialysis unit having eight diluting cells, nine concentrating cells, and two terminal cells arranged as described and shown in the FIGURE; 2. anionic membranes 61 CZL-219 and cationic membranes 111 EZL-219 (Ionics, Inc.), each membrane having an effective membrane area of 0.25 square feet or 232 square centimeters and essentially the same as the membranes used in example I, except that the membranes were backed with dynel instead of fiberglass; and,
3. 10 liters of a chlorine water feed stream, having an initial pH of 4.0, and comprising 2.9 percent hypochlorous acid and 0.65 N chloride anions, prepared from 3.8 percent chlorine gas and 96.2 percent caustic water by the method used in example I. 22.2 grams of sodium hydroxide per 977.8 grams of chlorine water were used.

To remove 90 percent of the chloride anions, the chlorine water feed stream was electrodialyzed for 50 minutes, operating at an average current density of 0.0970 amperes per square centimeter of membrane area. 92.1 percent of the original amount of hypochlorous acid present in the chlorine water feed stream was recovered.

Calculations of direct current electrical energy and specific membrane area requirements were made, resulting in an energy requirement of 1.44 kilowatt hours needed to process one pound of HOCl and in a specific effective membrane area requirement of 3.48 square feet to process one pound of HOCl per hour.

In any of the foregoing examples, a higher percentage of chloride anions can be removed by extending the time for which the chlorine water is passed through the diluting cells of the electrodialysis unit or by recycling the diluting cell effluent stream. Thus, for example, after 66 minutes in example IV, the chloride anion normality had reduced to 0.033 indicating that 94.6 percent of the chloride anions in the chlorine water feed stream had been removed.

Moreover, comparison of the foregoing examples demonstrates the significant advantages obtained in the electrodialysis processing of chlorine water when the chlorine water has a pH within the range of from about 2.75 to about 7.5. Less effective membrane area of the cationic and anionic membranes is required and a higher average current density can be employed without the prohibitive occurrence of concentration polarization when the chlorine water feed stream has a pH of from about 2.75 to about 7.5. Thus, the time and expense required for processing an equivalent amount of chlorine water can be substantially reduced under the preferred conditions herein.

What is claimed is:

1. The process of removing free molecular chlorine and free chloride anions from chlorine water by electrodialysis wherein the electrodialysis comprises the steps of:
   A. passing a feed stream of chlorine water into the diluting cells of an electrodialysis unit while simultaneously passing a feed stream of an aqueous electrolytic solution into the concentrating cells of said unit, said unit comprising a plurality of diluting cells which alternate in sequence with and are situated between adjacent concentrating cells, said unit additionally comprising a plurality of anionic and cationic ion-selective, semipermeable membranes which alternate in sequence, each membrane dividing and being shared by adjacent cells, said unit further comprising an anode and a cathode, which are contained in the terminal cells of said unit, said anode and said cathode being connected to a source of direct current; said cationic membrane forming the side of said diluting cell nearest the anode and the side of said concentrating cell nearest the cathode, and said anionic membrane forming the side of said diluting cell nearest the cathode and the side of said concentrating cell nearest the anode;
   B. passing a direct current of from about 0.001 to about 0.200 amperes per square centimeter of said membranes across said diluting and concentrating cells and across said anionic and cationic membranes and between said anode and cathode of said terminal cells; and
   C. recovering the essentially chlorine- and chloride-free aqueous solution of hypochlorous acid from the diluting cells.

2. The process of claim 1 wherein the chlorine water has a pH of from about 2.75 to about 7.5.

3. The process of claim 1 wherein the electrodialysis unit contains from 10 to about 100 concentrating and diluting cells.

4. The process of claim 3 wherein the anionic and cationic membranes are made of inorganic compounds or of synthetic organic resinous polymers to which are bonded dissociable ionic compounds.

5. The process of claim 4 wherein the anionic membrane is an organic membrane containing a sulfonated copolymer of polystyrene and the cationic membrane is an organic membrane containing tertiary amine or quaternary ammonium groups attached to a copolymer of polystyrene.

6. The process of claim 4 wherein the anionic and cationic membranes are stable in chlorine water.

7. The process of claim 5 wherein the aqueous electrolytic solution consists essentially of an aqueous solution of hydrochloric acid.

8. The process of claim 7 wherein the terminal cells are each adjacent to a concentrating cell and separated therefrom by an anionic membrane and wherein the aqueous electrolytic solution in said terminal cells is chloride and chlorine-free.

9. The process of claim 8 wherein the aqueous electrolytic solution in said terminal cells consist essentially of an aqueous solution of sulfuric acid.

10. The process of claim 1 whereby an aqueous solution of essentially chlorine and chloride-free hypochlorous acid is obtained, said chlorine water being prepared from about 85 percent to about 99.9 percent, by weight, water and from about 15 percent to about 0.1 percent, by weight, molecular chlorine gas and having a pH of from about 1.0 to about 7.5.